(12) United States Patent
Shi et al.

(10) Patent No.: US 12,312,490 B2
(45) Date of Patent: May 27, 2025

(54) WATERBORNE, UV CURABLE COATING COMPOSITION FOR EASY-CLEAN COATINGS

(71) Applicant: Akzo Nobel Coatings International B.V., Amsterdam (NL)

(72) Inventors: Zheng Shi, Shanghai (CN); Quan James Huang, Zhejiang (CN); Puxin Fang, Zhejiang (CN); Hong Lin, Guangdong (CN); Junbiao Lu, Shanghai (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 17/768,542

(22) PCT Filed: Oct. 13, 2020

(86) PCT No.: PCT/EP2020/078708
§ 371 (c)(1),
(2) Date: Apr. 13, 2022

(87) PCT Pub. No.: WO2021/074113
PCT Pub. Date: Apr. 22, 2021

(65) Prior Publication Data
US 2024/0034906 A1   Feb. 1, 2024

(30) Foreign Application Priority Data

Oct. 15, 2019  (WO) ................ PCT/CN2019/111254
Nov. 8, 2019   (EP) ..................................... 19207920

(51) Int. Cl.
| | |
|---|---|
| C09D 175/16 | (2006.01) |
| C08G 18/08 | (2006.01) |
| C08G 18/34 | (2006.01) |
| C08G 18/50 | (2006.01) |
| C08G 18/66 | (2006.01) |
| C09D 7/20 | (2018.01) |
| C09D 7/65 | (2018.01) |
| C09D 175/08 | (2006.01) |
| C09D 175/14 | (2006.01) |

(52) U.S. Cl.
CPC ....... *C09D 175/16* (2013.01); *C08G 18/0823* (2013.01); *C08G 18/348* (2013.01); *C08G 18/5015* (2013.01); *C08G 18/6692* (2013.01); *C09D 7/20* (2018.01); *C09D 7/65* (2018.01); *C09D 175/08* (2013.01); *C09D 175/14* (2013.01)

(58) Field of Classification Search
CPC ......................... C08G 18/0823; C08G 18/5105
See application file for complete search history.

(56) References Cited

U.S. PATENT DOCUMENTS

| | | | | |
|---|---|---|---|---|
| 5,068,135 | A | * 11/1991 | Zavatteri | ............ C08G 18/5015 |
| | | | | 427/430.1 |
| 8,030,412 | B2 | 10/2011 | Suzuki et al. | |
| 8,231,768 | B2 | 7/2012 | Sommer et al. | |
| 8,981,151 | B2 | 3/2015 | Klun et al. | |
| 9,701,850 | B2 | 7/2017 | Pokorny et al. | |
| 2009/0130453 | A1 | 5/2009 | Tanaka et al. | |
| 2011/0118405 | A1 | 5/2011 | Suzuki et al. | |
| 2012/0148846 | A1 | 6/2012 | Martin et al. | |
| 2016/0304742 | A1 * | 10/2016 | Klang | ................. C09D 175/06 |
| 2017/0101640 | A1 | 4/2017 | Tiang et al. | |

FOREIGN PATENT DOCUMENTS

| | | | |
|---|---|---|---|
| CN | 101775110 | * | 7/2010 |
| CN | 103890027 | | 6/2014 |
| CN | 104231228 A | | 12/2014 |
| CN | 105482680 A | | 4/2016 |
| CN | 108300274 | | 7/2018 |
| CN | 109054623 A | | 12/2018 |
| CN | 110105865 A | * | 8/2019 |
| EP | 2583986 A1 | | 4/2013 |
| JP | 2016148033 A | * | 8/2016 |
| WO | WO2019/129692 A1 | | 7/2019 |

OTHER PUBLICATIONS

Machine translation of CN 110105865 (no date).*
Machine translation of JP 2016-148033 (no date).*
Machine translation of CN 101775110 Specification (no date).*
"First Office Action," for Chinese Patent Application No. 202080070963.2 mailed Jul. 27, 2022 (10 pages).
English Translation of CN104231228A.
English Translation of CN105482680A.
English Translation of CN109054623A.
Search Report of Corresponding Application No. EP 19207920.0, dated May 28, 2020.
Search Report and Written Opinion of Corresponding Application No. PCT/EP2020/078708, mailed Dec. 7, 2020.
International Preliminary Report on Patentability of Corresponding Application No. PCT/EP2020/078708, mailed Sep. 21, 2021.

* cited by examiner

*Primary Examiner* — Marc S Zimmer
(74) *Attorney, Agent, or Firm* — Pauly, DeVries Smith & Deffner LLC

(57) ABSTRACT

The invention relates to the synthesis of a carboxyl-functional, unsaturated polyurethane containing a perfluoropolyether block, which can be used as an easy clean additive in preparation of a waterborne, UV curable coating composition. The polyurethane can be prepared by a method comprising the following steps: a) subjecting a hydroxy-terminated perfluoropolyether A to a reaction with a molar excess of polyisocyanate B to obtain an isocyanate-functional urethane C, b) adding a carboxyl-functional polyol D to the reaction mixture, c) adding OH— functional (meth) acrylate monomer E to the reaction mixture, wherein steps (b) and (c) can be performed in any order, and d) neutralizing the reaction product with a neutralizer F. The resulting coating has easy clean and anti-stain properties.

11 Claims, 3 Drawing Sheets

(a)                          (b)

(a)          (b)

(a) (b)

WATERBORNE, UV CURABLE COATING COMPOSITION FOR EASY-CLEAN COATINGS

CROSS-REFERENCE TO RELATED APPLICATIONS

This application is a 35 U.S.C. § 371 national phase application of PCT Application No. PCT/EP2020/078708 (WO 2021/074113 A1), filed on Oct. 13, 2020, which claims priority to International Application No. PCT/CN2019/111254, filed Oct. 15, 2019 and EP Application Serial No. 19207920.0, filed on Nov. 8, 2019, each of which is incorporated herein by reference in its entirety.

FIELD OF THE INVENTION

The present invention relates to the synthesis of a carboxyl-functional, unsaturated polyurethane and to a waterborne, UV curable coating composition containing the same. The coating composition can be used for producing easy-clean coatings, which are particularly useful in the field of consumer electronics or automotive coatings.

BACKGROUND

In the field of consumer electronic devices such as cellular phones, tablets, laptops, and automotive interiors various substrates are used, such as plastics, metal and glass. It is often desired to cover these substrates with easy-clean and stain resistant coatings. Easy-clean means that that the surface is repellent to water, oil and/or dirt. Easy-clean coatings reduce or eliminate the need to clean the surface.

It is known in the art that fluorinated polymers, particularly, perfluoropolyether (PFPE), have non-stick and lubricating properties and can be used to create easy-clean coatings. However, such resins are only soluble in fluorinated solvents and thus difficult to use in coating formulations without the use of special solvents. The problem is even bigger when one wants to use such resins in waterborne coating compositions, since fluorinated resins typically do not disperse well in water. Consequently, the improvement of easy clean property is often accompanied by deterioration of water dispersibility. As a result, most easy-clean coatings are typically solvent-borne.

There is a need to provide easy-clean coating compositions, preferably, waterborne coating compositions. It is also desired that the coatings are durable, stain-resistant and can withstand abrasion. It is further desired that the coating adheres well to substrates used in consumer electronics or automotive industries, particularly to plastic substrates.

SUMMARY OF THE INVENTION

In order to address the above-mentioned desires, the present invention provides, in a first aspect, a carboxyl-functional, unsaturated polyurethane containing a perfluoropolyether block, said polyurethane having a molecular weight Mn in the range from 1,000 to 5,000 determined by gel permeation chromatography with a polystyrene standard and tetrahydrofuran as the mobile phase, said polyurethane prepared by a method comprising the following steps:
  a) subjecting a hydroxy-terminated perfluoropolyether A to a reaction with a molar excess of polyisocyanate B to obtain an isocyanate-functional urethane,
  b) subjecting an isocyanate-functional urethane to a reaction with a carboxyl-functional polyol D,
  c) subjecting an isocyanate-functional urethane to a reaction with a mono-OH-functional (meth)acrylate monomer E,
  d) neutralizing the reaction product of either step b) or c) with a neutralizer G,
  wherein steps (b) and (c) can be performed in any order and wherein the method does not include chain extension with a diamine or diol.

In a further aspect, the invention provides a waterborne, UV curable coating composition, comprising the aqueous dispersion of the polyurethane according to the invention and at least one polymer different from the polyurethane, wherein the polyurethane is present in an amount 0.01-20 wt. % based on resin solids of the coating composition.

The invention also provides a method of coating a substrate, comprising applying the coating composition according to the invention to a substrate and curing the coating composition by means of UV radiation.

In yet another aspect, the present invention provides a coated substrate obtained according to the invention.

DETAILED DESCRIPTION OF THE INVENTION

Figure 1:
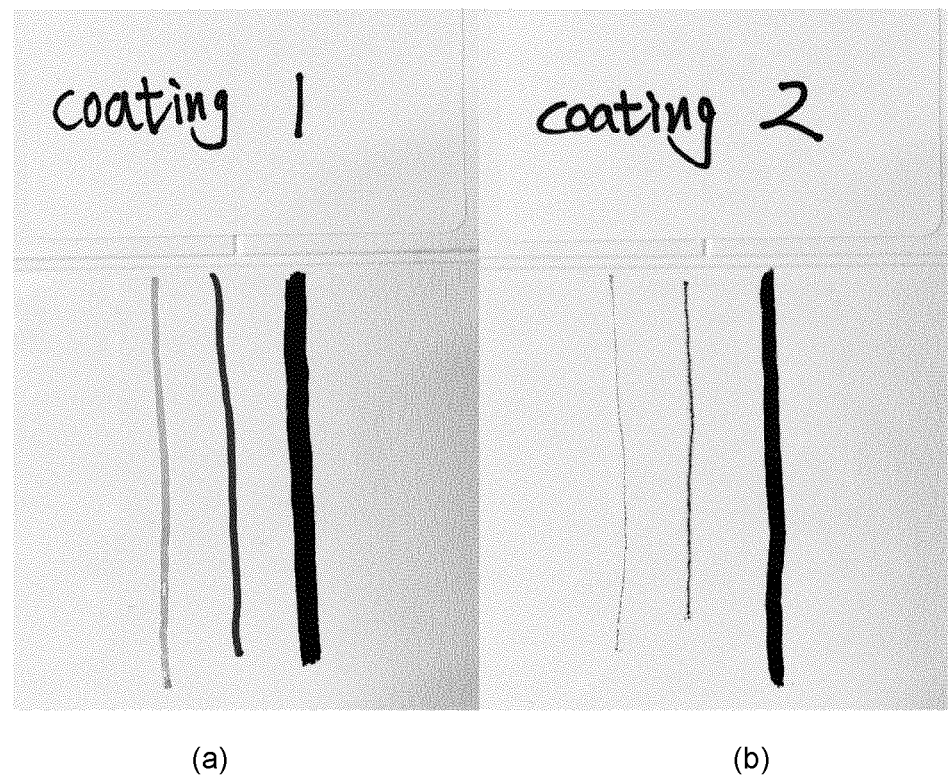
FIG. 1 shows a substrate coated with (a) a comparative coating (Coating 1) and (b) a coating according to the invention (Coating 2), with permanent marker lines.

The polymer used in the present invention is a carboxyl-functional, unsaturated polyurethane based on a perfluoropolyether (PFPE) resin. It can be prepared by a method comprising the following steps.

Step (a)

In the first step (a), a hydroxy-terminated perfluoropolyether A is subjected to a reaction with a molar excess of polyisocyanate B to obtain an isocyanate-functional urethane C.

(Per)fluoropolyethers (PFPE) are fluorinated polymers comprising a straight or branched fully or partially fluorinated polyoxyalkylene chain that contains recurring units having at least one catenary ether bond and at least one fluorocarbon moiety. PFPE can be divided into non-functional and functional; the former comprises a PFPE chain whose ends bear (per)haloalkyl groups, while the latter comprise a PFPE chain having at least two ends, wherein at least one end comprises a functional group. Functional PFPEs, in particular mono- and bifunctional PFPE, comprise a PFPE chain having two ends, wherein one or both end(s) bear(s) a functional group. Preferably a bifunctional PFPE is used. PFPEs preferably do not contain organosilicon groups, e.g. polysiloxane chains. Although polysiloxane chains are known to be used in coatings with easy clean performance, they are considered to have worse performance in terms of oil and water contact angle than PFPEs. Hydroxy-terminated perfluoropolyethers are functional perfluoropolyethers (PFPE) containing one or more OH groups at each of both ends. Hydroxy-terminated perfluoropolyether A preferably has a number average molecular weight of from 400 to 3000. Mn can be determined by gel permeation chromatography (GPC) using a polystyrene standard with tetrahydrofuran as the mobile phase.

Hydroxy-terminated perfluoropolyether A can have a general structure HO—(CF$_2$—CF$_2$—O)$_n$—OH or HO—(CF$_2$—CF$_2$—O)$_n$—(CF$_2$—O)$_m$—OH. It can also include blocks with ethylene oxide units and have the general structure:

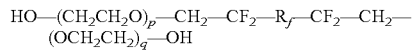
(OCH$_2$CH$_2$)$_q$—OH wherein p and q are integers independently chosen from 0 to 50, preferably from 1 to 50, wherein R$_f$ represents a bifunctional radical having perfluoropolyether structure (CF$_2$CF$_2$O)$_n$, (CF$_2$O)$_m$ or (CF$_2$—CF$_2$—O)$_n$—(CF$_2$—O)$_m$, and wherein n and m are integers independently chosen from 1 to 100. When both p and q are not zero, the resulting polymer has a better dispersibility in water. Preferably, p is in the range 1-5 and q is in the range 1-5.

Hydroxy-terminated perfluoropolyethers are commercially available from Solvay as Fluorolink® PFPE, or Fomblin® PFPE, e.g. Fluorolink® 5174X, Fluorolink® E10H, Fluorolink® PEG45.

The polyisocyanate B is a compound with reactive isocyanate groups and has a functionality of at least 2. Also mixtures of polyisocyanates can be used. The polyisocyanate can be aliphatic or aromatic. Examples of suitable polyisocyanates include hexamethylene diisocyanate, 2, 2, 4- and/or 2,4,4-trimethyl hexamethylene diisocyanate, p- and m-tetramethyl xylene diisocyanate, methylene bis(4-cyclohexyl isocyanate) (hydrogenated MDI), 4, 4-methylene diphenyl isocyanate (MDI), p- and m-phenylene diisocyanate, 2, 4- and/or 2,6-tolyene diisocyanate (TDI) and addicts thereof, and isophorone diisocyanate (IPDI). Preferred polyisocyanates include aliphatic diisocyanates such as IPDI, MDI and hexamethylene diisocyanate.

The reaction is performed in a molar isocyanate excess. The molar ratio of the functional groups of A to B is preferably 1:1.1 to 1:5, more preferably from 1:2 to 1:4. During the reaction, it is desired that all the functional groups of PFPE are reacted and that some amount of polyisocyanate B is left for the reaction in the further steps. Isocyanate excess also keeps the molecular weight relatively low since it prevents from forming polymer chains with several PFPE fragments in the same chain. Preferably, the isocyanate-functional urethane C does not have more than one PFPE fragment in the polymer chain.

The reaction conditions of forming the urethane compound are generally known to the skilled person. The reaction temperature can be in the range 40-160° C., preferably in the range 50-100° C. Conventional catalysts can be used such as dibutyl tin dilaurate (DBTDL), stannous octoate, diazobicyclo (2.2.2) octane (DABCO), Zn ACAC, tin octoate. The amount of catalyst is preferably from 0.005 to 1 part by weight per 100 parts by weight of the urethane forming monomers. Suitable solvents can be utilized such as n-butyl acetate, N-methyl-pyrrolidone, toluene, and the like. Preferably, the solvent is water-miscible.

The isocyanate-functional urethane C comprising a perfluoropolyether block, obtained in step (a), is subjected to the following two steps (b) and (c) in any order. It is important that both steps (b) and (c) are performed.

Step (b)

In step b), a carboxyl-functional polyol D is added to the reaction mixture under conditions of urethane formation.

Preferably, the carboxyl-functional polyol D is a diol, more preferably a polyester diol. Preferably, it contains at least one carboxylic acid group. Preferably, the carboxyl group is a tertiary acid group.

Preferably, compound D has the following formula:

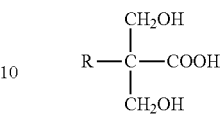

wherein R is a hydrogen or a C1-16 alkyl group. Preferably R is a C1-C3 alkyl group. More preferably, compound D is 2,2-dimethylolpropionic acid (DMPA) or 2,2-dimethylolbutanoic acid (DMBA). Such compounds are commercially available e.g. DMPA HA-0135 from GEO Chemicals.

Compound D can also be a polymer, e.g. acid functional linear polyester polyol. Such compounds are commercially available e.g. DMPA polyol HA-0135 LV2 from GEO Chemicals.

If compound D is a polymer, then it preferably has an OH value of 20-190, more preferably 50-150 mg KOH/g resin. It preferably has an acid value of 20-250, more preferably 50-200 mg KOH/g resin. The acid value can be measured by potentiometric titration, e.g. in accordance with DIN EN ISO 3682. The hydroxyl value can be measured by potentiometric titration using the TSI method, e.g. according to ASTM E1899-08.

The reaction with the carboxyl-functional polyol D allows to introduce carboxyl groups in the polymer chain, which contributes to water dispersibility of the resulting polymer.

In some embodiments, step b) is performed before step c). In these embodiments, there is no need to monitor NCO content. Preferably, the reaction of step b) is performed under conditions of excess isocyanate groups (e.g. with the polyisocyanate B present), in order to obtain an isocyanate-functional polymer, which can react with the OH-functional (meth)acrylate monomer E in step c). The molar ratio of the functional groups of isocyanate-functional urethane to carboxyl-functional polyol D is preferably from 1:1.1 to 1:5, more preferably from 1:2 to 1:4.

In other embodiments, step b) is performed after step c). In these embodiments, the progress of the reaction is monitored by analyzing the NCO content over time. The reaction is stopped when no NCO content is detected anymore.

The reaction conditions of the urethane reaction are known to the skilled person. Generally, the conditions described for step (a) can be used.

Step (c)

In step c), an OH-functional (meth)acrylate monomer E is added to the reaction mixture under condition of urethane formation reaction.

OH-functional (meth)acrylate monomer E has at least one OH group and it preferably has 1 to 5 (meth)acrylate groups. More preferably it only has one hydroxyl group (monofunctional alcohol). It is preferred to use compounds with a molecular mass not higher than 1,500. Suitable compounds include (meth)acrylic esters of polyols, e.g. of ethylene glycol, pentaerythritol and dipentaerythritol. Examples include 2-hydroxyethyl (meth)acrylate, penta-erythritol (meth)acrylate, penta-erythritol di(meth)acrylate, penta-erythritol tri(meth)acrylate, dipenta-erythritol (meth)acrylate, dipenta-erythritol di(meth)acrylate, dipenta-erythritol tri(meth)acrylate, dipenta-erythritol tetra(meth)acrylate and dipenta-erythritol penta(meth)acrylate. Preferred compound E is dipenta-erythritol pentaacrylate (DPPA).

The reaction conditions of the urethane reaction are known to the skilled person. Generally, the conditions described for step (a) can be used.

In some embodiments, step c) is performed after step b). In these embodiments, the progress of the reaction is monitored by analyzing the NCO content over time. The reaction is stopped when no NCO content is detected anymore.

In other embodiments, step c) is performed before step b). In these embodiments, there is no need to monitor NCO content. Preferably, the reaction of step c) is performed under conditions of excess isocyanate groups, in order to obtain an isocyanate-functional polymer, which can react with the carboxyl-functional polyol D in step b). It can be desired to perform step c) before step b), i.e. add monomer E before polyol D is added, in order to prevent the chain extension caused by forming multiple repeating fragments of monomer E and polyol D.

Conventional catalysts can be used such as mentioned earlier. Preferably dibutyltin dilaurate (DBTDL) is used. The amount of catalyst is preferably from 0.005 to 1 part by weight per 100 parts by weight of the urethane forming monomers. Also known inhibitors, such as BHT (butylated hydroxytoluene), can be used.

After both steps (b) and (c) (in any order) are performed, a carboxyl-functional, unsaturated polyurethane is obtained. By structure, it can be considered a modification of a PFPE chain with urethane fragments to bring in the functional groups for the water dispersibility and UV curing.

It is important that this polyurethane has a sufficiently low molecular weight. Without wishing to be bound by theory, it is considered that the low molecular weight makes it possible to use this polyurethane as an easy clean additive in combination with a different (non-fluorinated) main binder resin in a coating. Upon curing of the coating, the low-weight additive can migrate to the surface and exercise its easy clean properties. For the best migration properties and associated easy clean properties, the polyurethane preferably has a weight average molecular weight Mw in the range 2,000-20,000, more preferably in the range 4,000-15,000. Most preferred ranges for Mw include 2,000-12,000 and 4,000-9,000. The polyurethane preferably has a number average molecular weight Mn in the range 1,000-5,000, more preferably in the range 1,000-3,000. Molecular weights Mn and Mw can be determined by gel permeation chromatography (GPC) with a polystyrene standard and tetrahydrofuran as the mobile phase.

The resulting polyurethane preferably has an acid value in the range 10-50 mg KOH/g. The acid value can be measured by potentiometric titration, e.g. in accordance with DIN EN ISO 3682. Preferably, the resulting polyurethane does not have OH functionality. The hydroxyl value is preferably <5 mg KOH/g, more preferably 0 mg KOH/g. The hydroxyl value can be measured by potentiometric titration using the TSI method, e.g. according to ASTM E1899-08.

Step (d)

In step (d), the carboxyl-functional, unsaturated polyurethane is neutralized with a neutralizer F. Neutralizer F can be ammonia or a tertiary amine, or a mixture of amines.

Neutralizer F is preferably a saturated tertiary amine, e.g. triethylamine, tripropyl amine, triethanolamine, diethylenetriamine, methylamine and N,N-dimethyl ethanol amine (DMEA). Preferably, DMEA is used. Advantages of the use of a saturated tertiary amine, such as DMEA, is that the resulting polymer is better dispersible in water.

Neutralizer F can also be an ethylenically unsaturated tertiary amine, particularly, a tertiary amine with a (meth) acrylate functionality. Examples of these include 2-(diethylamino)ethyl acrylate, 2-(diethylamino)ethyl methacrylate, 2-(dimethylamino)ethyl acrylate, 2-(dimethylamino)ethyl methacrylate, t-butylaminoethyl acrylate, t-butylaminoethyl methacrylate. Preferably, neutralizer F comprises 2-(dimethylamino)-ethyl-methacrylate or 2-(dimethylamino)-ethyl-acrylate. Unsaturated amines may contribute to a higher crosslinking density of the coating composition, thereby improving physical properties of the coating.

Neutralizer F is preferably added in an amount to achieve a neutralization degree of 20-150%, more preferably 80-120% of the carboxylic groups of the polyurethane, calculated as the molar ratio of the base groups from the neutralizer and the carboxylic groups from polyurethane.

The resulting neutralized polyurethane can be dispersed in water. Alternatively, it can be provided in the form of a solution in an organic solvent to be dispersed later. In the latter case, preferably organic solvents soluble or miscible with water are used. Examples of such solvents include acetone, methoxypropyl acetate (PMA), butyl acetate etc. Presence of water-miscible solvents makes emulsification in water easier, when preparing a waterborne coating composition.

In order to keep the molecular weight low, it is desired that the method does not contain steps of chain extension, e.g. with diamines or diols, which are common in polyurethane preparation. Typically, such a step would be carried out after dispersion in water (step (d)).

The solid content of the obtained polyurethane solution is preferably in the range 30-70 wt. %.

The obtained polyurethane can be used as an easy clean additive in preparation of coating compositions. Preferably the solution of the polyurethane is used as such and further emulsified (dispersed in water). If desired, the solvent used during the synthesis can be removed from the dispersion by known methods, e.g. by distillation.

Coating Composition

In another aspect, the present invention provides a waterborne, UV curable coating composition comprising the above-described carboxyl-functional, unsaturated polyurethane as an additive. The polyurethane is used in combination with other polymer(s) in the coating composition. The advantages of using the polyurethane as an additive and not as a main resin include, for example, the low costs. Good easy clean performance can be achieved already with low amounts of the additive in combination with conventional binder resins.

The unsaturated polyurethane of the invention is preferably used in an amount 0.01-20 wt. %, or 0.05-15 wt. %, or 0.1-5 wt. % of solids to total resin solids weight of the coating composition. Total resin solids weight includes the weight of all binder resins and crosslinkers, if present, but excludes the weight of pigments and additives, if present.

The coating composition further comprises at least one polymer different from the polyurethane described above. Preferably, the polymer is non-fluorinated. Such polymers can be e.g. polyesters, polyurethanes, (meth)acrylates. Preferably, the other polymer is also radiation curable, preferably, UV curable. The polymer can be a poly(meth)acrylate or a mixture thereof. Under "poly(meth)acrylate" polymers are understood that have a crosslinkable (meth)acrylate functionality. Examples include poly(methyl methacrylate), poly(methacrylic acid), polymethacrylate, poly(ethyl methacrylate), poly(2-hydroxyethyl methacrylate), but also polyurethane (meth)acrylate or polyester (meth)acrylate. The content of the at least one other polymer is preferably from 10 to 90 wt. % of the total solid content of the coating composition. Preferably, the coating composition comprises at least one poly(meth)acrylate or a mixture of poly(meth)acrylates in an amount from 30 to 80 wt. % based on the total weight of the coating composition.

The coating composition can also comprise copolymerizable monomers and oligomers as reactive diluents. Examples of such monomers include (meth)acrylate monomers, particularly methyl (meth)acrylate, ethyl (meth)acrylate, isopropyl (meth)acrylate, butyl (meth)acrylate, isobutyl (meth)acrylate, ethyl hexyl (meth)acrylate, dipentaerythritol hexaacrylate, acrylonitrile, methacryl amide. Also vinyl monomers can be used, e.g. vinyl acetate, vinyl propionate, vinyl butyrate, styrene.

Preferably, the coating composition comprises at least one photoinitiator or a mixture thereof. Photoinitiators generate free radicals when exposed to radiation energy. Any suitable UV photoinitiator known in the art can be used. Suitable photoinitiators include benzoin derivatives, benzile ketales, α-hydroxyalkylphenones, monoacylphosphine oxide (MAPO) and bisacylphosphine oxides (BAPO), such as diphenyl(2,4,6-trimethylbenzoyl)phosphine oxide, 1-hydroxy-cyclohexyl-phenyl-ketone, bis(2,4,6-trimethylbenzoyl)-phenylphosphineoxide, bis(2,6-dimethoxybenzoyl)-2,4,4-trimethylpentyl-phosphine oxide, 2-hydroxy-2-methyl-1-phenyl-propan-1-one, 2-methyl-1[4-(methylthio)phenyl]-2-morpholono-propan-1-one, a phenyl glyoxylic acid methyl ester. Mixtures of these compounds may also be employed. Photoinitiators are commercially available, e.g. from IGM Resins.

The photoinitiator is preferably present in amount of from 0.1 to 10 wt. %, for example from 0.5 to 5.0 wt. % or from 0.5 to 2.5 wt. %, based on the total weight of the composition.

The coating composition is preferably waterborne. Waterborne coating compositions comprise water as the major liquid phase when preparing and/or applying the coating composition. "Major liquid phase" means that water constitutes at least 50 wt. % of the liquid phase, preferably at least 80 wt. %, more preferably at least 90 wt. %, in some embodiments even 100 wt. %. The coating composition preferably contains 20 to 80% by weight of water, based on the total weight of the coating composition.

Optionally, the coating composition can in addition contain organic solvents. For example, organic solvents can be present in up to 40%, preferably, up to 30% by weight of the liquid phase. It may be preferred in some embodiments that the coating composition contains less than 10 wt. % of organic solvents, or even does not contain organic solvents, based on the total weight of the coating composition.

Example of suitable organic solvents include alcohols (such as ethanol, isopropanol, n-butanol, n-propanol), esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; chlorinated hydrocarbons (such as $CH_2Cl_2$); ethers (such as diethyl ether, tetrahydrofuran, propylene glycol monomethyl ether) and mixtures thereof. Preferably, the solvent is water-miscible. Preferred organic solvents include butyl acetate, methyl isobutyl ketone (MIBK), methyl ethyl ketone (MEK), propylene glycol monomethyl ether and methoxy propyl acetate (PMA), or mixtures thereof.

The solid content of the coating composition according to the invention can be in the range from 1 to 90 wt. %, preferably 5 to 65 wt. %, more preferably 10 to 50 wt. %.

The coating composition can further comprise conventional additives, such as fillers, antioxidants, matting agents, pigments, abrasion resistant particles, flow control agents, surfactants, plasticizers, adhesion promotors, thixotropic agents, light stabilizers and others.

The present invention further provides a method of coating a substrate, comprising applying the coating composition according to the invention to a substrate and curing the coating composition by means of UV radiation.

The coating composition can be applied onto a wide range of substrates by conventional techniques including spraying, rolling, blade-coating, pouring, brushing or dipping. After evaporation of water and optionally organic solvents, if present, the coating composition results in a coating that is dust-dry to slightly tacky.

Curing is then induced by means of UV radiation. Any suitable source of UV radiation can be used, e.g. Hg lamps, metal halide lamps, xenon lamps, UV-LED lamps. It is preferred to use UV-LED lamps. Skilled person is able to determine suitable conditions for curing by UV radiation.

Curing of the coating composition can be done at ambient conditions, e.g. room temperature. Room temperature is understood here as from 15 to 30° C. The curing can also be accelerated by heating. The coated substrate can be heated to a temperature in the range 40-100° C., more preferably 50-80° C. Conventional methods can be used, e.g. placing in an oven. Heating is preferably done before or simultaneously with UV curing.

The coating composition according to the present invention can be applied to a wide range of substrates including metallic and non-metallic substrates. Suitable substrates include polycarbonate acrylonitrile butadiene styrene (PC/ABS), polycarbonate, polyacrylate, polyolefin, polyamide, polystyrene, polyamide, glass, wood, stone, aluminium, aluminium alloys, and the like.

The coating composition according to the present invention can be used as a single layer applied directly to the substrate, or in multilayer systems, e.g. as a primer, basecoat or clearcoat.

The coating composition according to the present invention can be used in various coating industries, such as, consumer electronics, automotive, packaging, wood flooring and furniture, home appliance, glass and windows, sports equipment.

The present invention further provides a substrate coated with the coating obtained from the coating composition of the invention. The coatings according to the present invention have exceptionally good general properties including adhesion and abrasion resistance. In addition, the coatings also have excellent easy clean and anti-stain properties as can be tested with a permanent marker pen.

EXAMPLES

The invention will be demonstrated with reference to the following examples. All parts and percentages are by weight unless specified otherwise.

Fluorolink E10H—hydroxyl-functional PFPE polymer from Solvay, Mn~1600

DPPA—dipentaerythritol pentaacrylate from Kayaku chemical (Wuxi) Co., Ltd.

DMBA—dimethylol butanoic acid from Shanghai Dibo Biotechnology Co., Ltd.

HA-0135 LV2—DMPA polyol, acid functional linear polyester polyol from GEO Specialty Chemicals, acid value 100-115 mg KOH/g, OH value 100-115 mg KOH/g DMEA—dimethyl ethanol amine

Example 1. Synthesis of Polyurethane 1

Isophorone diisocyanate (15.42 g), n-butyl acetate (17.6 g), dibutyl tin dilaurate (0.1 g) and butylated hydroxytoluene (0.1 g) were placed into a four-neck round bottom flask that is equipped with an agitator and a condenser. Fluorolink E10H (58.97 g) was dropped into the mixture at 60° C. for one hour. The reaction mixture was heated at 60° C. for half an hour. Then DPPA (20.47 g) was dropped into the mixture within half hour at 80° C. and the mixture was cooked at 80° C. for half an hour. Then dimethylol butanoic acid (DMBA) (5.14 g) was added into the mixture at 80° C., cooked at 80° C. for one hour. Then the temperature increased to 90° C. and the reaction proceeded until no NCO groups were detected. The reaction mixture was cooled down to 60° C. and DMEA (3.41 g) was added to the mixture and stirred for another half hour at 60° C.

The resulting polyurethane has Mn 1106, Mw 4948, PD 4.5. The acid value of the polyurethane is 19.5 mg KOH/g before neutralization, the OH value 0 mg KOH/g.

Example 2. Synthesis of Polyurethane 2

Isophorone diisocyanate (20.05 g), n-butyl acetate (25 g), dibutyl tin dilaurate (0.1 g) and butylated hydroxytoluene (0.1 g) were placed into a four-neck round bottom flask that is equipped with an agitator and a condenser. Fluorolink E10H (38.34 g) was dropped into the mixture at 60° C. for one hour. The reaction mixture was heated at 60° C. for half an hour. Then HA-0135 LV2 (14.99 g) was dropped into the mixture within half an hour at 60° C. and the mixture was heated at 80° C. for half an hour. Then DPPA (26.62 g) was added into the mixture at 80° C. and cooked at 80° C. for one hour. The temperature was then increased to 90° C. and the reaction proceeded until no NCO groups were detected. The reaction mixture is then cooled down to 60° C., DMEA (3.21 g) was added and stirred for another half an hour at 60° C.

The resulting polyurethane has Mn 1497, Mw 12141, PD 8.1. The acid value of the polyurethane is 27 mg KOH/g before neutralization, the OH value 0 mg KOH/g.

Example 3. Preparation of a Coating Composition

Two coating samples were prepared according to Table 1 below.

TABLE 1

|  | Coating 1 | Coating 2 |
| --- | --- | --- |
| Waterborne UV resin (solid content: 45%) | 60 g | 60 g |
| Dispersion of Polyurethane 1 (solid content: 50 wt. %) | 0 g | 0.24 g |
| Photoinitiators (solid content: 60 wt. %) | 2 g | 2 g |
| Wetting agent | 0.3 g | 0.3 g |

Coating 1 contains a commercially available waterborne UV curable resin (Mitsui Chemicals, Olester RA7011).

Coating 2 contains a mixture of the same waterborne UV curable resin with 0.4 wt. % of the polyurethane additive (on resin solids) prepared in Example 1 and added as a 50 wt. % dispersion in water.

Both formulas were applied onto PC/ABS substrates and cured by exposure to ultraviolet light to form Coating 1 and Coating 2.

Example 4. Tests

Water contact angle was measured on top of the cured coatings, respectively, with 20 Sessile drop method. The droplets were set as 3 μl/droplet, and the measurement temperature was about 20° C. The contact angles are measured using DataPhysics instrument with software SCA 20. The test results are shown in the Table 2 below.

Oil contact angle tests were conducted similarly with the same method. The droplets were set as 2 μl/droplet, and the measurement temperature was about 20° C. The test results are shown in the Table 2 below as well.

TABLE 2

| Surface Properties: | | |
| --- | --- | --- |
|  | Coating 1 | Coating 2 |
| Water contact angle | 83.48 | 106.98 |
| Hexadecane contact angle | 22.82 | 59.85 |

According to Table 2, water contact angle and hexadecane contact angle of Coating 2 are significantly increased by using the additive according to the invention compared with the comparative Coating 1. Therefore, Coating 2 has much better anti-stain and easy clean properties than Coating 2, which also can be confirmed by FIGS. 1 and 2.

Oil-based ink repellence ability and easy clean performance of two coatings

Figure 2:
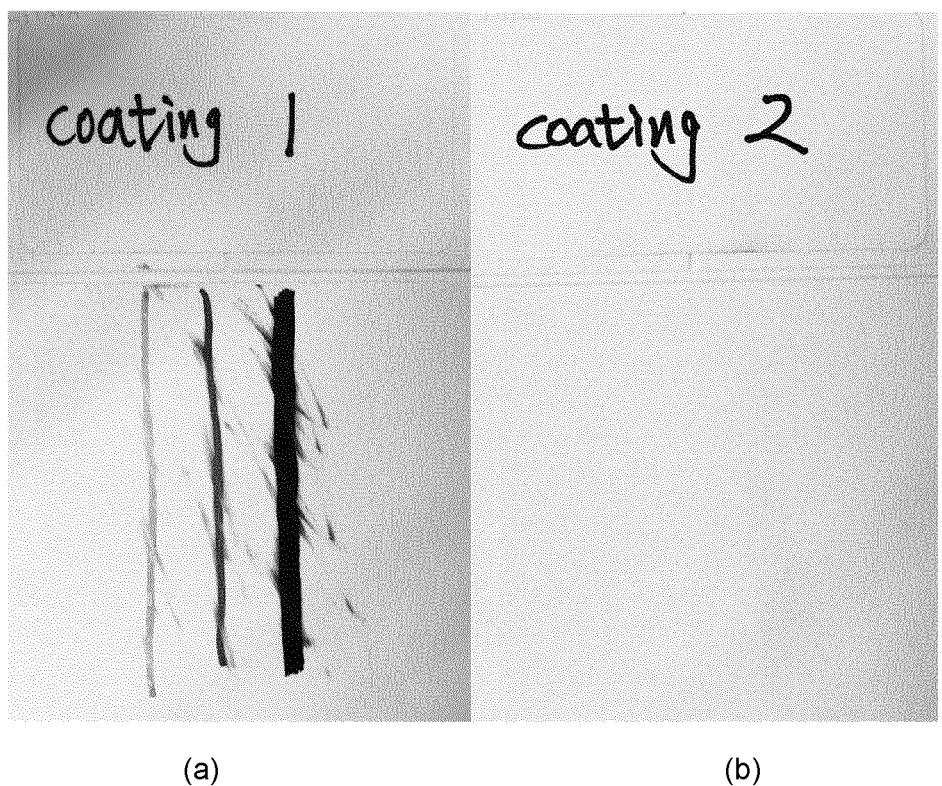
FIG. 2 shows the substrate coated with (a) a comparative coating (Coating 1) and (b) a coating according to the invention (Coating 2), after the easy-clean test.

Oil-based permanent marker pens with different colors were used to draw lines on top of the cured coatings, respectively. Pictures were taken to show the different appearance of the inks wrote onto the two coatings. FIG. 1 shows the inks well spread on the coating 1 surface, FIG. 2 shows the red and blue inks do not well spread but shrink to beads on the coating 2 surface due to the lower surface energy of coating 2 than coating 1. However, black ink spreads well and does not shrink to beads on coating 2, which probably due to the chemical components' differences and black color of the ink.

FIGS. 1 and 2 show the surface appearance of Coatings 1 and 2 after cleaning with a dry tissue. The inks cannot be cleaned on coating 1, but all coloured inks can be wiped off totally on Coating 2 by the dry tissue. Therefore, the polyurethane additive in Coating 2 dramatically improved the easy clean and anti-stain performances, compared to those of comparative Coating 1.

Example 5

Coating 3 was prepared in the same way as Coating 2 but using an aqueous 50 wt. % dispersion of Polyurethane 2 prepared in Example 2 instead of Polyurethane 1.

The coating composition was applied onto a PC/ABS substrate and cured by exposure to ultraviolet light to form Coating 3.

The ink repellent ability and easy clean performance is tested in the same way as in Example 4.

Figure 3:
FIG. 3(a) shows the ink repellent ability of Coating 3 according to the invention after drawing with the permanent marker.
FIG. 3(b) shows the substrate after the ink has been wiped off with a tissue.
Figure 3:

FIG. 3(a) shows the ink repellent ability of Coating 3 after drawing with the permanent marker. FIG. 3(b) shows the substrate after the ink has been wiped off with the tissue.

This example demonstrates the ink repellence and easy clean properties of a coating using Polyurethane 2 as an easy clean additive.

The invention claimed is:

1. A waterborne, UV curable coating composition, comprising an aqueous dispersion of a polyurethane and at least one non-fluorinated polymer different from the polyurethane, wherein the polyurethane is present as an additive in an amount 0.1-5 wt. % based on resin solids of the coating composition, and wherein the polyurethane is a carboxyl-functional, unsaturated polyurethane containing a perfluoropolyether block, said polyurethane having a molecular weight Mn in the range from 1,000 to 5,000 determined by gel permeation chromatography with a polystyrene standard and tetrahydrofuran as the mobile phase, said polyurethane prepared by a method comprising the following steps:
   a) subjecting a hydroxy-terminated perfluoropolyether A to a reaction with a molar excess of polyisocyanate B to obtain an isocyanate-functional urethane,
   b) subjecting the isocyanate-functional urethane to a reaction with a carboxyl-functional polyol D to obtain an isocyanate-functional polymer,
   c) subjecting the isocyanate-functional polymer obtained in step b) to a reaction with a mono-OH-functional (meth)acrylate monomer E,
   d) neutralizing the reaction product of step c) with a neutralizer G to obtain a neutralized polyurethane,
   e) dispersing the neutralized polyurethane obtained in step d) in water;
   and wherein the method does not include chain extension with a diamine or a diol after dispersing the neutralized polyurethane in water.

2. The coating composition according to claim 1, wherein compound A has a general structure

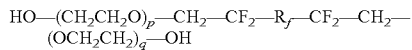

HO—$(CH_2CH_2O)_p$—$CH_2$—$CF_2$—$R_f$—$CF_2$—$CH_2$—$(OCH_2CH_2)_q$—OH wherein p and q are integers independently chosen from 0 to 50, $R_f$ represents a bifunctional radical having perfluoropolyether structure $(CF_2CF_2O)_n$, $(CF_2O)_m$ or $(CF_2$—$CF_2$—$O)_n$—$(CF_2$—$O)_m$, and wherein n and m are integers independently chosen from 1 to 100.

3. The coating composition according to claim 1, wherein the carboxyl-functional polyol D is 2,2-dimethylolpropionic acid (DMPA) or 2,2-dimethylolbutanoic acid (DMBA).

4. The coating composition according to claim 1, wherein the mono-OH-functional (meth)acrylate monomer E is dipentaerythritol pentaacrylate (DPPA).

5. The coating composition according to claim 1, wherein the at least one polymer different from the polyurethane is non-fluorinated.

6. The coating composition according to claim 5, wherein the at least one polymer different from the polyurethane is a poly(meth)acrylate.

7. The coating composition according to claim 1, further comprising a photoinitiator.

8. The coating composition according to claim 1, further comprising an organic solvent in an amount less than 10 wt. %, based on the total weight of the coating composition.

9. A method of coating a substrate, comprising applying the coating composition according to claim 1 to a substrate and curing the coating composition by means of UV radiation.

10. A coated substrate obtained according to the method of claim 9.

11. The coated substrate according to claim 10, wherein the substrate is selected from the group consisting of polycarbonate acrylonitrile butadiene styrene (PC/ABS), polycarbonate, polyacrylate, polyolefin, polyamide, polystyrene, glass, wood, aluminum, and aluminum alloys.

* * * * *